(12) United States Patent
Harms et al.

(10) Patent No.: US 9,394,058 B2
(45) Date of Patent: Jul. 19, 2016

(54) METHOD FOR CONTROLLING AN OBSTRUCTION LIGHT AND A WIND PARK FOR CARRYING OUT SUCH A METHOD

(71) Applicant: Wobben Properties GmbH, Aurich (DE)

(72) Inventors: Stephan Harms, Upgant-Schott (DE); Gerd Moller, Bremen (DE)

(73) Assignee: Wobben Properties GmbH, Aurich (DE)

( * ) Notice: Subject to any disclaimer, the term of this patent is extended or adjusted under 35 U.S.C. 154(b) by 104 days.

(21) Appl. No.: 14/359,889

(22) PCT Filed: Nov. 9, 2012

(86) PCT No.: PCT/EP2012/072333
§ 371 (c)(1),
(2) Date: May 21, 2014

(87) PCT Pub. No.: WO2013/075959
PCT Pub. Date: May 30, 2013

(65) Prior Publication Data
US 2014/0300497 A1    Oct. 9, 2014

(30) Foreign Application Priority Data
Nov. 23, 2011 (DE) .......................... 10 2011 086 990

(51) Int. Cl.
*B64D 47/06* (2006.01)
*B64D 45/00* (2006.01)
(Continued)

(52) U.S. Cl.
CPC ............... *B64D 45/00* (2013.01); *F03D 7/048* (2013.01); *F03D 11/0041* (2013.01); *F05B 2270/303* (2013.01); *F05B 2270/333* (2013.01); *Y02E 10/722* (2013.01); *Y02E 10/723* (2013.01)

(58) Field of Classification Search
CPC .. F21W 2111/00; F21W 2111/06; B64F 1/20; F21Y 2101/02
USPC .......................... 340/981, 539.1, 983, 815.45
See application file for complete search history.

(56) References Cited

U.S. PATENT DOCUMENTS 7,602,074 B2    10/2009    Voss
8,636,388 B2    1/2014    Roer
(Continued)

FOREIGN PATENT DOCUMENTS

DE    102 07 824 A1    12/2003
EP    2 110 553 A2    12/2014
(Continued)

*Primary Examiner* — Jack K Wang
(74) *Attorney, Agent, or Firm* — Seed Intellectual Property Law Group PLLC

(57) ABSTRACT

The invention concerns a method of controlling the flight lighting arrangement of a wind park by means of acoustic monitoring or wind park comprising one or more wind power installations, wherein the wind park has an acoustic monitoring device having a microphone arrangement, wherein the microphone arrangement records sound signals, noises or the like from the environment of the wind park and said sound signals are processed in a signal processing device connected to the microphone arrangement, wherein there is provided a switching device for switching on a flight lighting arrangement of at least one wind power installation of the wind park and the switching device is coupled to and controlled by the signal processing device so that the signal processing device causes the switching device to switch on the flight lighting arrangement if a sound signal of a flying object, for example an aircraft or a helicopter, is detected by means of the acoustic monitoring device, and/or a predetermined sound signal (for example sine sound) is superposed and/or falsified by the noises of the flying object.

20 Claims, 5 Drawing Sheets

(51) Int. Cl.
  *F03D 7/04* (2006.01)
  *F03D 11/00* (2006.01)
  *B64D 47/00* (2006.01)
  *G08B 5/22* (2006.01)
  *G08B 1/08* (2006.01)

(56) References Cited

U.S. PATENT DOCUMENTS

| | | | | |
|---|---|---|---|---|
| 2009/0289804 A1* | 11/2009 | Carstensen | F03D 11/00 | 340/601 |
| 2010/0156303 A1 | 6/2010 | Wulff | | |
| 2010/0194603 A1* | 8/2010 | Wobben | F03D 11/0041 | 340/983 |
| 2010/0246846 A1* | 9/2010 | Burge | H04R 1/1041 | 381/74 |
| 2011/0142621 A1* | 6/2011 | D | F03D 7/0292 | 416/1 |
| 2011/0192212 A1* | 8/2011 | Delprat | F03D 11/00 | 73/12.01 |
| 2011/0291853 A1* | 12/2011 | Riesberg | F03D 1/003 | 340/686.6 |
| 2012/0146783 A1* | 6/2012 | Harms | B64F 1/20 | 340/539.1 |
| 2013/0278445 A1* | 10/2013 | Quell | F03D 11/0041 | 340/983 |
| 2014/0246856 A1* | 9/2014 | Santiago Benito | F03D 7/0224 | 290/44 |

FOREIGN PATENT DOCUMENTS

| | | |
|---|---|---|
| RU | 2350768 C2 | 3/2009 |
| SU | 19169 A1 | 1/1931 |
| WO | 2010/010043 A2 | 1/2010 |
| WO | 2010/133541 A1 | 11/2010 |

* cited by examiner

METHOD FOR CONTROLLING AN OBSTRUCTION LIGHT AND A WIND PARK FOR CARRYING OUT SUCH A METHOD

BACKGROUND

1. Technical Field

The invention concerns a method of controlling a flight obstacle lighting arrangement and a wind park having means for carrying out the method.

2. Description of the Related Art

A large number of proposals have already been made, for controlling flight obstacle lighting arrangements of wind power installations.

Thus it is known that the flight obstacle lighting arrangements (also referred to as "flight lighting arrangements" for brevity) of wind power installations in a given geographical region are constantly switched on or off in dependence on the respective time of day.

Proposals have also already been made for equipping a wind park comprising a plurality of wind power installations with a radar device so that then flying objects, for example aircraft and the like, which are in the proximity of the wind park (and for example are on a collision course with the wind park) have attention drawn to the wind park by the flight lighting arrangement being switched on.

The present invention takes as its basic starting point international patent application WO 2010/133541 as relevant state of the art.

That application, the content of which is also made content of the present application, discloses equipping a wind park by means of a so-called secondary radar, which means that at least one wind power installation of the wind park is in a position to receive and evaluate a transponder signal, for example from an aircraft or also an air traffic control center. In that case the transponder signal is a so-called "DF 17 signal" which is typical in air traffic, that is to say it also includes height information. If the height information can certainly exclude collision of the flying object with the wind park the flight obstacle lighting arrangement remains switched off. That is the case for example when the transponder signal contains height information of 30,000 ft (ft=1 foot).

If however the transponder signal includes height information which involves a markedly shorter distance for the flying object in relation to the wind park, for example height information for 1,000 ft, the flight obstacle lighting arrangement of the wind park is switched on so that all flight obstacle lighting arrangements of the wind power installations are activated and thus the position of the wind power installations of the wind park is made optically clear to the flying object.

Although the described solution in accordance with WO 2010/133541 is already a very good, reliable and also inexpensive solution, nonetheless malfunctions cannot be entirely excluded.

BRIEF SUMMARY

One or more embodiments of the invention is to improve the system known from WO 2010/133541, in particular for the situation where the secondary radar is damaged or has totally failed or the transponder signal transmitting unit in the flying object fails.

According to one embodiment of the invention it is proposed that a single wind power installation and/or certain wind power installations of the wind park and/or all wind power installations of the wind park are equipped with a microphone arrangement and thus with an acoustic monitoring device. In that respect microphone arrangement can also mean an individual microphone or also a plurality of microphones which are disposed relative to each other in the manner of a microphone array, that is to say x microphones on a surface, in a given spatial arrangement. The air space or the region surrounding the wind park is now acoustically monitored by means of the microphone arrangement, virtually in the manner of an "acoustic camera".

For that purpose all noises in the environment of the wind park are detected and fed to a signal processing system as part of the acoustic monitoring device.

In that respect the provision of certain filters or signal processing algorithms means that preferably such noises of which it is known with certainty that they have nothing to do with the approach of a flying object are already left out of consideration (or are "left out of the reckoning" from the overall noises). Thus for example wind noises, in particular those which are caused by virtue of the wind impinging on the wind power installation involve a quite typical spectrum (usually relatively high-frequency) but also a given noise backdrop (noise pattern) which differ acoustically from the noises or the typical frequencies of an aircraft. Thus for example wind noises can also be filtered relatively reliably out of the overall wind backdrop by pop protection devices, such as pop shields, of microphones so that such wind noises are no longer at all recorded by the microphone. In the case of such pop protections however care is to be taken to ensure that they are also highly weather-resistant.

The wind power installation itself can also cause noises, either by adjustment of the rotor blades and/or by azimuth adjustment (yaw adjustment) or also due to other parts of the wind power installation, for example the brakes, etc.

Whenever the microphone arrangement and the signal processing system disposed downstream thereof detect that the only noise that it detect is one that originates from the wind power installation itself or from the wind, whether because the wind is impinging on the parts of the wind power installation, or from gusts, or also if noises are detected which originate from the ground of the wind power installation, for example from agricultural vehicles or other vehicles in the proximity of the wind power installation, that has no effect on switching on the flight lighting arrangement, that is to say the arrangement is not switched on in relation to such noises.

If however noises of a flying object, for example an aircraft or a helicopter, are detected with the microphone arrangement, that is established by means of the signal processing device and, if that signal processing device controls a switching device for switching on the flight obstacle lighting arrangement, the flight obstacle lighting arrangement is switched on. The flight obstacle lighting arrangement then remains switched on for a certain time, for example 10 minutes, and is then automatically switched off again, unless the microphone arrangement still detects the noise of the flying object. In such a case the flight obstacle lighting arrangement is then in turn continued in operation for a further period of time, for example a further 10 minutes, and the flight obstacle lighting arrangement is switched off until the microphone arrangement can no longer detect the noise of the flying object.

Associated with the signal processing system of the microphone arrangement is a memory device in which various spectra of aircraft and/or typical noises of aircraft are stored as comparative parameters.

As soon as the microphone arrangement detects noises of flying objects those noises are compared to the noises stored in the memory and, if there is sufficient coincidence, the flight obstacle lighting arrangement is caused to switch on.

Alternatively or also additionally the noises of the flying object, that are recorded by the microphone arrangement, can be assessed in respect of their frequencies, for example by means of a frequency analysis, and the frequency spectrum, measured in that way, of the recorded noise is then compared to corresponding stored frequency spectra and, if there is sufficient coincidence, the flight obstacle lighting arrangement is switched on.

Preferably the microphone arrangement is disposed on the wind power installation of the wind park, on which there is in any case already a secondary radar device, that is to say a device for receiving a transponder signal, for example a "DF 17 signal", that is to say a signal which includes height information, for example 30,000 ft or positional information, for example "North Pole".

Preferably the microphone arrangement comprises two or more microphones, the microphones being arranged on different sides of the pods of the wind power installations. As modern flight obstacle lighting arrangements usually also comprise at least two flashing and/or lighting devices (red light for night time lighting and white light for daytime lighting), which are also arranged on different sides of the pod of a wind power installation, the microphones are preferably arranged where the signal lighting devices, that is to say the lighting and/or flashing devices, are arranged, and are thus also held by the corresponding devices which hold the signal devices, that is to say the lighting devices (lamps, flashing lights and so forth).

If now a flying object approaches a wind power installation or the wind park and thus the wind power installations of the wind park and a noise of the flying object is recorded and thus measured by means of the microphone arrangement, the flight obstacle lighting arrangement is switched on, more specifically even when a transponder signal, that is to say a DF 17 signal, is received, which includes height information, for example 30,000 ft, in respect of which a relevant approach between the flying object and the wind park can be reliably excluded.

If the secondary radar device receives a transponder signal, that is to say for example a DF 17 signal, which causes the flight obstacle lighting arrangement to switch on, such switching-on of the flight obstacle lighting arrangement is also implemented. At the same time however the microphone arrangement can also acoustically detect the approach of the flying object and thus confirm the decision to switch on the lighting arrangement, but it is also preferable for the recorded acoustic signals of the flying object, that is to say the noises thereof, to be recorded and stored as comparative noises in the memory which is associated with the signal device of the microphone arrangement. Thus one embodiment of the invention also makes it possible for acoustic monitoring to be virtually "self-learning" or adaptive, as it is to be expected that the noises of an aircraft which are once detected by the microphone arrangement will be detected again at a later moment in time (when an aircraft of the same type again approaches the wind power installation or the wind park), and thus the acoustic monitoring effect is also set to the location of the wind power installation or the location of the wind park and the noise spectrum stored there is suitably adapted or enhanced. As each wind park or each wind power installation is disposed at another location and the noise backdrop of a wind park or a wind power installation within the wind park is not only dependent on the adjacent installations in the wind park or typical civil noises (for example street traffic, railroad traffic and so forth), but also dependent on the geographical profile where the wind park or the wind power installations are set up, such self-learning adaptation is highly desirable.

It is thus understandable for example that certain flight noises can be perceived or heard entirely differently if a wind power installation or a wind park is located in the North Germany lowland plain or is in a hilly area or indeed in an area with steeply rising mountains/cliffs which certainly already allow acoustic echoing.

If a noise of a flying object is detected by means of the microphone arrangement (that is to say by means of the acoustic monitoring device) then, as already described, the flight lighting arrangement of the wind power installation or installations of the wind park is switched on. If then at the same time however no transponder signal is detected or a transponder signal which includes height information for the flying object is detected, from which it would not be possible to infer noise detection, if therefore the noise signal measured by the microphone arrangement cannot be brought into meaningful coincidence with the transponder signal or the height information, a corresponding item of information, for example a warning message, e-mail and so forth is composed, for example to an air traffic control center or to a service station of the wind park and such information can also be used to check the proper working order of the transponder signal receiving apparatus.

Alternatively or supplemental to the acoustic monitoring already described above by means of a microphone arrangement it is also possible for the environment of a wind power installation or a wind park to be monitored visually, for example by means of cameras, preferably also infrared cameras, that is to say cameras with which the production of a thermal image relating to the wind park environment is possible. As soon as thermal images have been detected in given sectors by means of such cameras, for example the sector is formed by the region above a predetermined horizon which is itself selected, it is concluded that a flying object is approaching. In that respect care is then to be taken to ensure that it is not every measured thermal event that straightaway leads to one of the flight lighting arrangements being switched on, but only when the thermal event is also of a given quality in order thereby to prevent the flight lighting arrangement from being switched on if for example there is a bird in the proximity of the wind power installation.

In addition it is possible to monitor the environment of a wind park alternatively to or supplemental to acoustic monitoring, by means of a camera arrangement for, as aircraft also have their own light signaling apparatus which in particular can also be very well seen at night, then in dependence on what is detected with the camera in turn above a self-established horizon, the flight lighting arrangement of a wind power installation or installations of a wind park can be switched on.

BRIEF DESCRIPTION OF THE SEVERAL VIEWS OF THE DRAWINGS

An embodiment of the present invention is described in greater detail hereinafter with reference to the accompanying Figures in which.

DETAILED DESCRIPTION

FIGS. 1 to 4 are known from WO 2010/010043, except for the representation of the microphones. The content of that application is also made subject-matter of the present application by incorporation by reference for all purposes.

Figure 1:
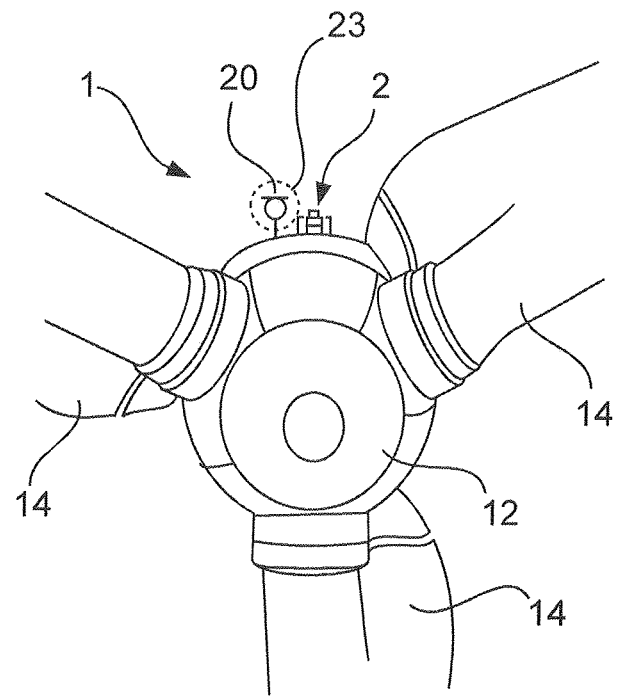
FIG. 1 shows a front view on to the rotor hub of a pod according to an embodiment of the invention.

FIG. 1 shows a pod 1 as a front view on to the hub cover 12 with three rotor blades 14 which are only shown however in their root region. Of the rotor blades 14 one is in a so-called 6 o'clock position and in that case conceals a pylon on which the pod 1 is arranged. Two further rotor blades 14 are arranged in their 10 o'clock and 2 o'clock position respectively and thus allow viewing of a central lighting device 2 arranged at the top on the pod 1. The central lighting device 2 is in the form of a panoramic lamp. A left-hand and a right-hand lateral lighting device (4, 6 in FIG. 2) are covered in FIG. 1 by the rotor blades 14 in the 10 o'clock and 2 o'clock position respectively.

Figure 2:
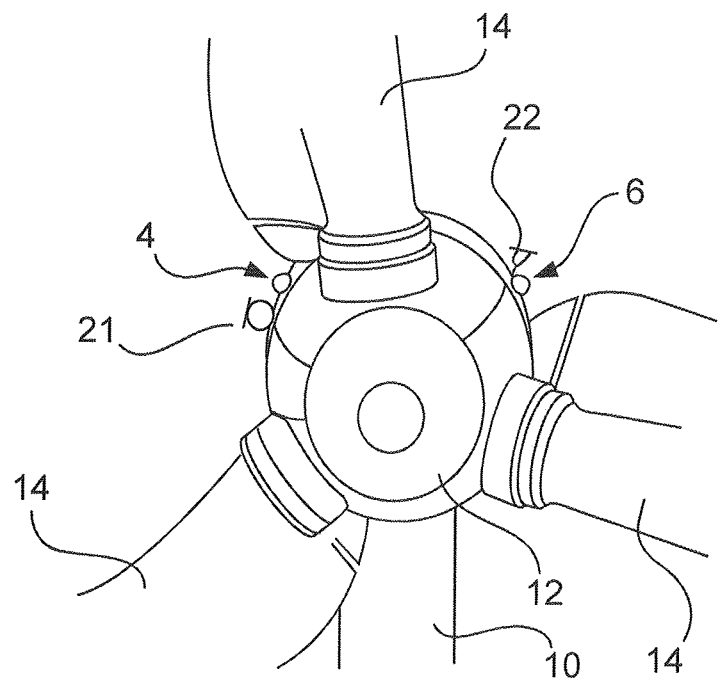
FIG. 2 shows a pod in a front view as in FIG. 1 but with the rotor in an altered position, FIG. 3 a side view of a pod according to the embodiment shown in FIGS. 1 and 2.

Looking at FIG. 2 the rotor with the rotor blades 14 has rotated further relative to FIG. 1 and a rotor blade 14 is now almost in a 12 o'clock position. This upwardly facing rotor blade 14 now conceals the central lighting device 2. In return there is a view of the left-hand lateral lighting device 4 and the right-hand lateral lighting device 6. Moreover there is also a view of the pylon 10 which is only indicated here.

Figure 3:
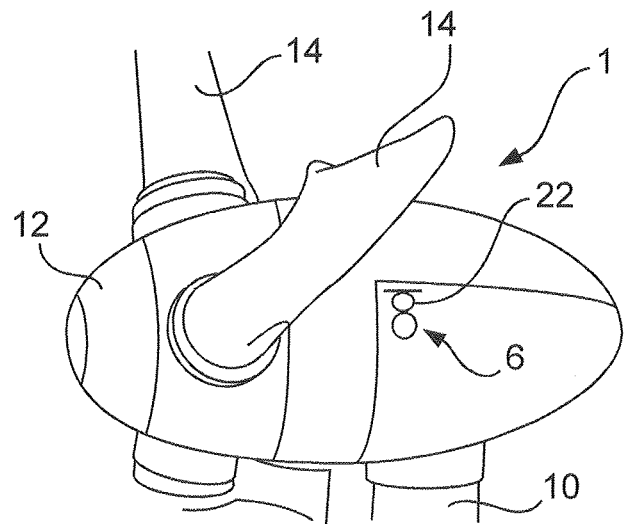

The position of the right-hand lateral lighting device 6 will be clear from the side view of the pod 1 in FIG. 3. The right-hand lateral lighting device 6 is arranged approximately in the center of the pod 1 in the longitudinal direction thereof, that is to say referring to FIG. 3 in the direction from right to left. That is also approximately the widest location of the pod 1. In a vertical direction the right-hand lighting device 6 is somewhat higher than the center of the pod 1. In this FIG. 3 the central lighting device which is arranged on the top of the pod is covered by the rotor blade 14 which faces towards the viewer, but the lateral lighting device 6 is visible.

Figure 4:
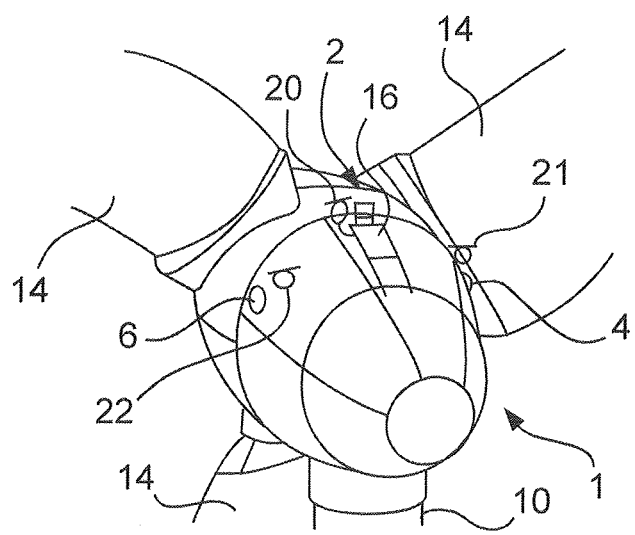
FIG. 4 shows a rear view of a pod according to the embodiment shown in one of FIGS. 1 to 3.

All three lighting devices 2, 4, 6 can be seen from the rear view in FIG. 4. The central lighting device 2 is arranged on the top of the pod 1. The right-hand and left-hand lateral lighting devices 6, 4—which by virtue of the rear view in FIG. 4 are to be seen at the left and the right—are disposed approximately at mutually opposite sides. The pod 1 is thus arranged approximately between the right-hand and the left-hand lateral lighting devices 6, 4. In addition the three lighting devices 2, 4, 6 are arranged approximately on an annular region around the pod 1, that annular region being arranged in a plane, parallel to the plane of the rotor blades. In addition FIG. 4 also shows an exit hatch 16 immediately behind the central lighting device 2.

As can also be seen from FIGS. 1 and 4, the wind power installation is equipped with a plurality of microphones 20, 21 and 22. Those microphones are preferably placed precisely at the locations where the lighting devices 2, 4 and 6 are also arranged. That has the advantage that electric connections are in any case already present there and there are also devices adapted to mechanically hold the microphones. In particular however arranging the microphones at those locations also has the advantage that, when a flying object approaches the rear part of the pod, acoustic detection of the noises of the flying object can be reliably detected at any time. That however also applies to the situation where the aircraft approaches the pod from the side or from the front side, that is to say where the flying object approaches the rotor. In the latter case the arrangement of the microphones also ensures that at no moment in time does a rotor blade simultaneously cover both microphones and thus acoustically shield them, for, as can be seen in particular from FIG. 2, there is always at least one of the microphones 21, 20 or 22 that is to be seen, irrespective of the rotor position, from the front side.

It is easily possible to increase the number of microphones on the pod and also to place further microphones at other locations. It is also possible to reduce the number of microphones, for example to operate only with a single microphone 20, or only with one of the microphones 21 or 22. In order from the outset not to allow wind noises at all to the microphone diaphragms and thus into the microphone the microphones 20, 21 and/or 22 can also be provided with conventional pop protection devices. That pop protection device is preferably weather-resistant and also protects the microphone from the influences of weather, for example rain, moisture and so forth. The weather protection for the microphones can also be afforded by the microphones being disposed in an independent casing in order thereby to be reliably protected from moisture, rain, hail, snow and so forth.

As an alternative to arranging the microphones externally on the pod however it is also possible for the microphone or microphones to be disposed in the pod. That has the advantage that this automatically gives good protection from wind and weather, for weather protection is already now afforded within the pod, that is to say at the location, within which the generator and other important parts of the machine carrier of the wind power installation are disposed. Arrangement within the pod is particularly advantageous when the pod housing in turn transmit sound very well, which is the case when the pod housing consists of metal, for example aluminum sheet. More specifically, the sound noises from the exterior are then also transmitted by way of the pod housing, that is to say the wall thereof, under some circumstances even in boosted form, because the entire pod also performs the function of a sound receiver and thus the pod wall virtually represents a sound diaphragm and the noises recorded by way of the entire pod are then also passed into the interior of the pod.

In such a case it is also conceivable for the microphone arrangement according to an embodiment of the invention to be very easily provided, for example in the form of an acceleration sensor coupled to the pod wall. More specifically when a flying object approaches the wind power installation the sound of that flying object causes the pod wall to move in a given manner typical of the flying object, and that movement can be very exactly measured by an acceleration sensor or a strain sensor. The flying object-typical noise can thus also be detected by that particular form of an acceleration or strain sensor.

Figure 7:
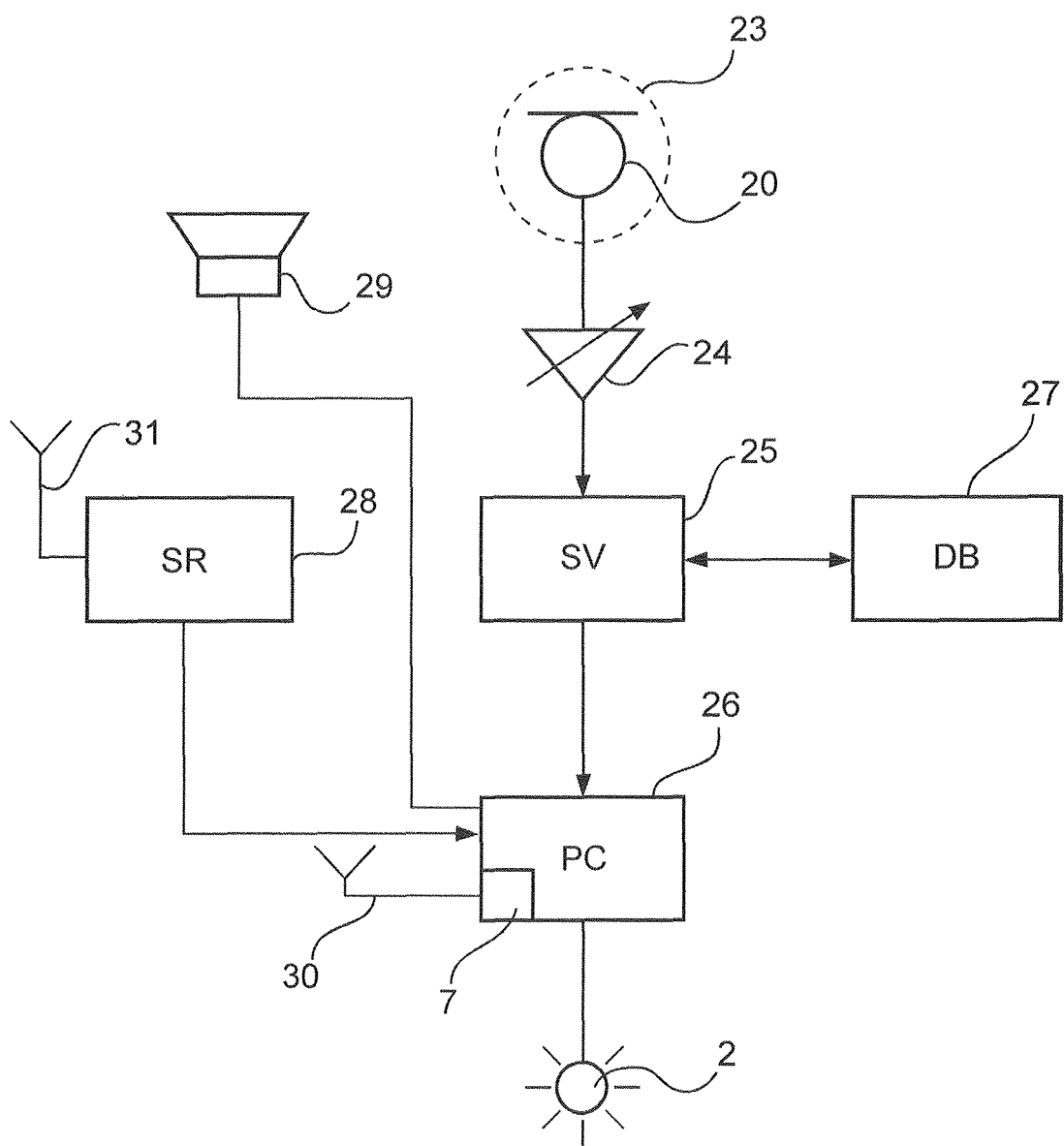
FIG. 7 shows a block circuit diagram according to an embodiment of the invention.

FIG. 7 shows by way of example a simple block circuit diagram of an acoustic monitoring device according to one embodiment of the invention with a microphone and a control means for the flight lighting arrangement 2. As can be seen here the microphone 20 is provided with a pop protection 23. The noises recorded by the microphone 20 are amplified in an amplifier 24 or pre-processed in a suitable device 24 and those signals are then passed to a signal processing device 25. This signal processing device can on the one hand comprise a frequency analysis unit so that the corresponding frequency pattern or frequency spectrum of the noises recorded by the microphone arrangement is ascertained from those noises and/or the recorded noise signal is subdivided in time into blocks and then the results of the signal processing device 25 are passed to a PC 26. That PC 26 (personal computer or "CPU"—central processing unit) can also be the so-called SCADA computer of the wind park, that is to say a central computer of the wind park, by way of which control of the flight lighting arrangement or other devices is implemented. In the computer or PC 26 or in a comparator, the results of the signal processing operation can be compared to comparative values from a data bank 27. For example it is possible for both genuine noises or noise patterns (sound files) and/or frequency patterns or frequency spectra of typical flying objects to be stored in the data bank.

If there is sufficient coincidence from the comparison of the recorded signals of the microphone 20 and the stored signals in the data bank 27 and if it can be relatively certainly concluded that a flying object is approaching then the PC switches on the flight lighting arrangement 2.

Figure 5:
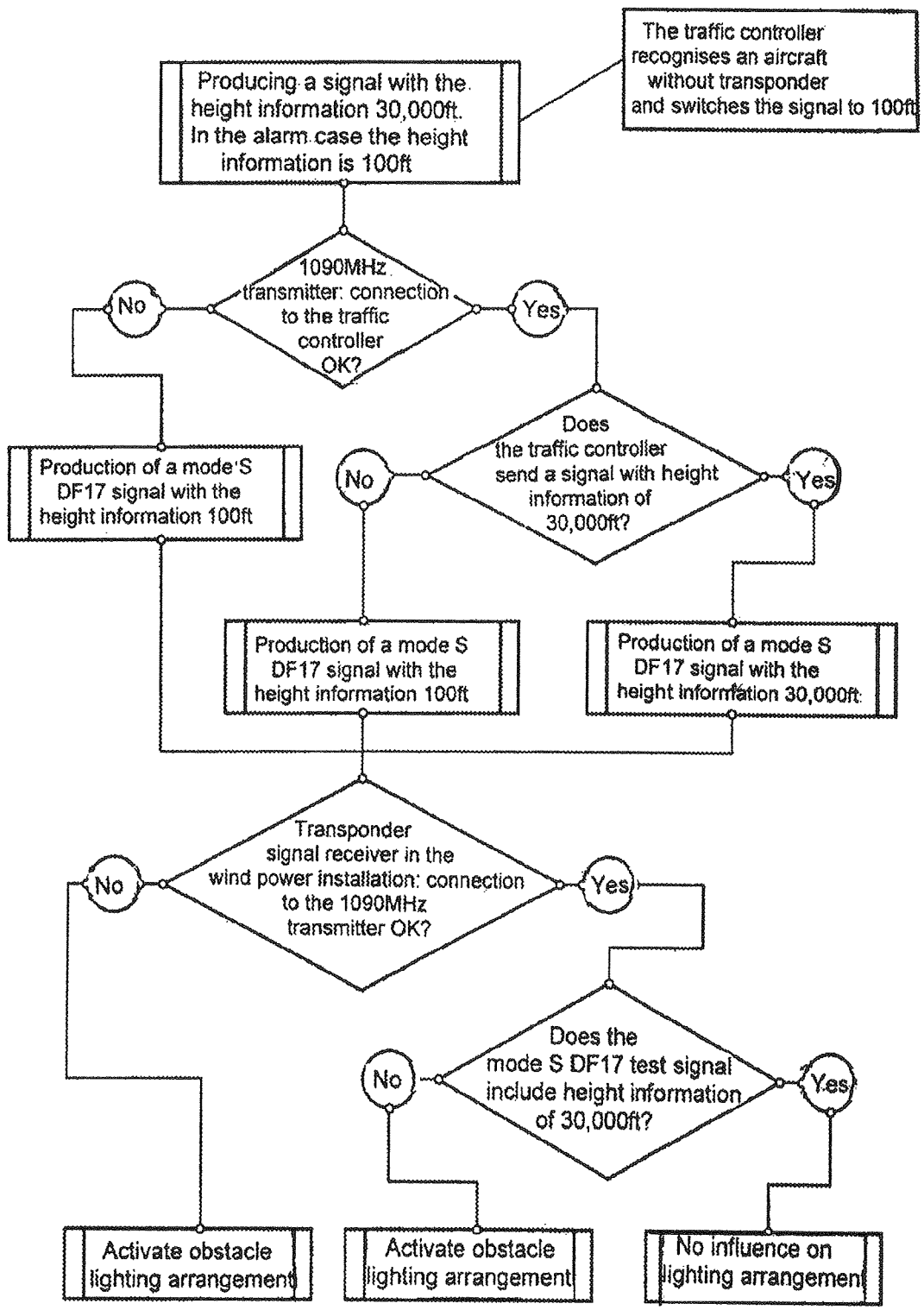
FIG. 5 shows a flow chart of a backup system in the event of failure of an aircraft transponder.
Figure 6:
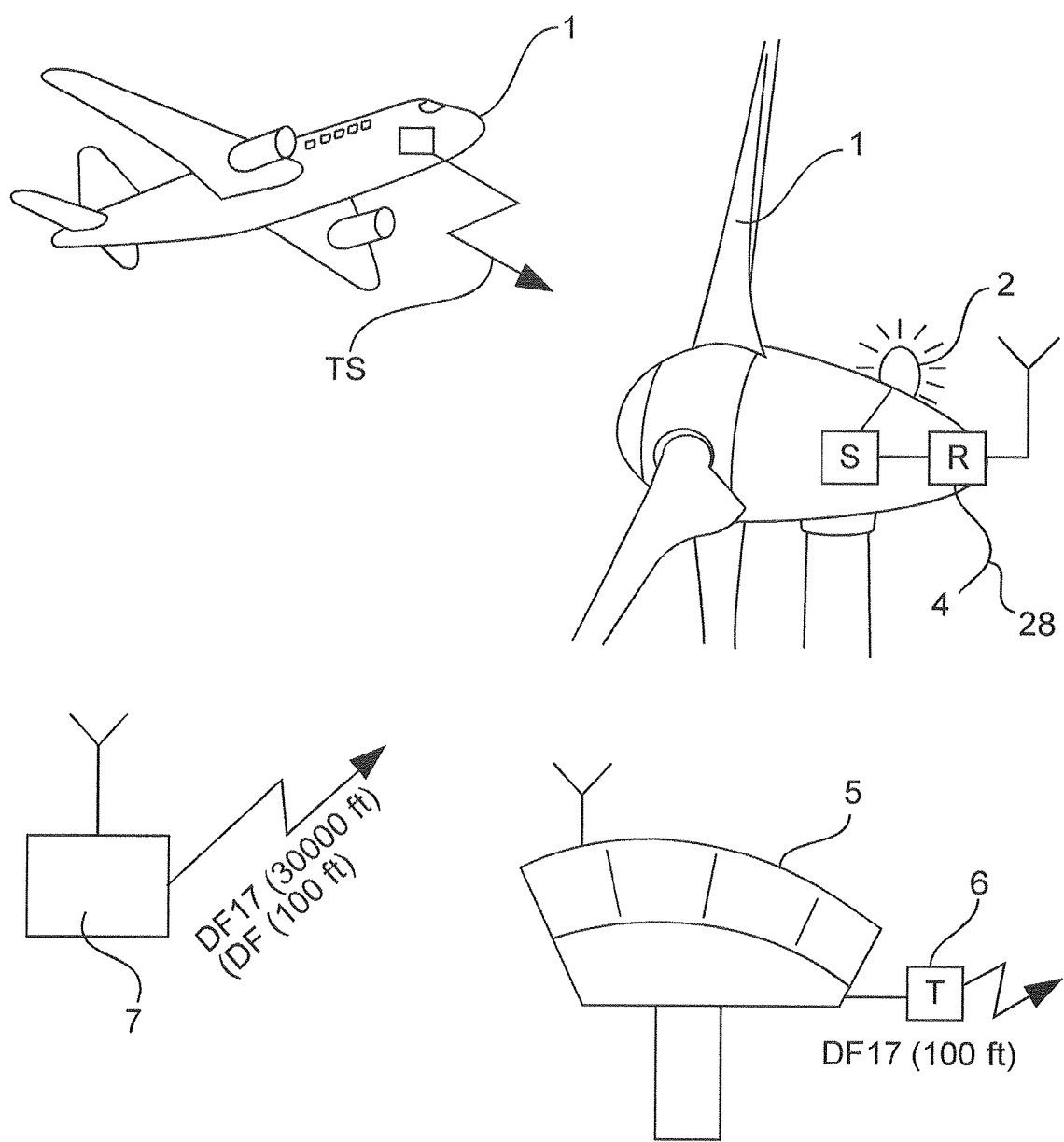
FIG. 6 shows a further embodiment of the invention.

At the same time the PC 26 can be connected to a secondary radar device 28, the basic structure of which is shown in FIGS. 5 and 6. The secondary radar device as such is also known from above-mentioned international patent application WO 2010/133541.

If the reception of a DF 17 signal is established by means of the secondary radar device 28, which involves a relatively low height detail, for example 100 ft, that is also passed to the PC 26 (which here performs the function of a switching device) and that PC then switches on the flight lighting arrangement 2 and any further flight lighting arrangements of the wind power installation.

That is also effected if no acoustic signal or no noise of a flying object is detected by means of the microphone device 23.

The other way round in turn, the flight lighting arrangement 2 is also switched on when the noise of a flying object is detected by means of the microphone 23 and is recognized as such, even if no DF signal (transponder signal) of a flying object is acquired by way of the secondary radar device, being a signal which signifies a possible approach or endangerment, for example a DF 17 signal with the height information "30,000 ft".

The PC therefore implements "or" linking of the signal inputs from the signal processing device 25 and the radar device 28 respectively.

If a noise of a flying object is received and at the same time a DF signal involving a relatively low height detail, for example 100 ft, is received, the flight lighting arrangement 2 is switched in any case. At the same time in that situation the recorded noise (or after frequency analysis by means of a frequency analyzer, the frequency spectrum thereof) can also be stored as a pattern in the data bank 27 so that with time, a noise data bank which is adapted for the location of the wind park or wind power installation in which the device shown in FIG. 7 is implemented is set up so that it is possible to arrive at a more reliable decision as to whether the flight lighting arrangement 2 is or is not switched on, because of a given noise event.

The signal processing device can also involve a filter function by means of which typical civil noises, for example traffic on the ground at the wind power installation or other devices which are on the ground at the wind power installation, in particular however also by means of which noises of the wind power installation itself, which for example originate from the pitch drive or which arise upon azimuth adjustment of the wind power installation, are filtered out of the microphone signal or removed therefrom by calculation. Typically the civil noises, like also the noises caused by the wind power installation itself, have a quite different frequency spectrum from that of a flying object and, by means of the arrangement shown in FIG. 7, the installation itself can in turn enlarge its own noise or frequency spectrum trend data bank by way of the storage of typical frequency patterns or noises which it causes itself in the data bank 27 so that in turn, in the event of any noises, it is possible to predict with a much greater degree of certainty whether this involves an event which should trigger activation of the flight lighting arrangement 2, that is to say switch it on.

As shown in FIG. 7 there can also be a loudspeaker 29 arranged at a given spacing relative to the microphone 20, for example at a predetermined spacing, for example about 0.1 to 5 mm, on the pod of the wind power installation within the wind park. The noises stored in the data bank (that is say in the memory) 27 can now also be passed to PC 26 and the latter can then pass corresponding electric signals to the loudspeaker 29 so that the loudspeaker produces typical noises for example of a flying object or also typical noises which occur upon pitch or azimuth adjustment of the wind power installation. If the loudspeaker 29 produces for example typical noises of a flying object, for example a helicopter, they are received by the microphone 20, suitably evaluated, and would then have to lead to a switch-on event for the flight lighting arrangement 2. If however the microphone 20 has a technical problem or if the subsequent stages in the signal processing and evaluation arrangement involve a technical malfunction, that is certain to be detected in the PC 26 (which is also part of the signal processing device or the acoustic monitoring device), and a corresponding warning indication, for example e-mail, SMS or the like, can be sent to an air traffic control center or also to the service arrangement for the wind power installation so that the latter can more closely consider the technical problem to make possible repairs.

Preferably a program is stored in the PC, which repeatedly, for example once daily, performs the test of the acoustic monitoring of the specific installation for flying objects within given periods of time.

Preferably the test results are stored in a memory and can in turn also be passed to a central location for documentation purposes.

For the situation where the test device, that is to say by means of the PC 26, detects that acoustic monitoring is suffering from a fault, a continuous switch-on signal can also be set so that then the flight lighting arrangement 2 remains constantly switched on until the damage at the acoustic monitoring system has been removed.

As already mentioned FIGS. 5 and 6 show an arrangement of a radar device for a wind power installation, as is known from WO 2010/133541.

It will be appreciated that the wind power installation according to an embodiment of the invention can also be designed without a secondary radar device so that the air space can be monitored only by means of acoustic monitoring in order thereby to be sure to cause the flight lighting arrangement to be switched on when a flying object approaches.

Acoustic monitoring which is effected as in the manner of an "acoustic camera" with the illustrated microphones does however also have the advantage that, when the wind park or a wind power installation has a secondary radar device as disclosed in FIGS. 5 and 6, that secondary radar device, with the described acoustic air space monitoring, acquires a further backup system and is even more reliable, even for the situation where the secondary radar device is also faulty or fails, for whatever technical reason.

Typical transponder signals, that is to say typical DF (in particular DF 17) signals with a desired height information (for example 30,000 ft or 100 ft) can also be produced by means of the PC 26 and they can then be transmitted by way of an antenna 30. That antenna can in turn be arranged on the wind power installation of the wind park, on which the secondary radar device is in any case already disposed (the antenna however can also be arranged on other wind power installations of the wind park).

Normally now the antenna 31 of the secondary radar device 28 should receive the corresponding DF 17 signal, that is to say the transponder signal, and evaluate it so that self-testing of the secondary radar device is also possible, as is already the case with acoustic monitoring.

If the approach of a flying object is detected by means of acoustic monitoring of the air space, if therefore by means of the microphone arrangement of the wind power installation, and that leads to the flight lighting arrangement of the wind power installation of the wind park being switched on, the switch-on signal can also be sent to other wind power installations in the surroundings, that is to say also to those wind power installations which are not at all part of the wind park. Those wind power installations can then also in turn switch on their flight lighting arrangement.

The microphones 20, 21 and 22 of the wind power installation are preferably provided with particularly good solid-borne sound insulation so that as little solid-borne sound as possible of the wind power installation is transmitted to the microphones.

As described, when a loudspeaker (or sound signal generator) is installed in the proximity of the microphone arrangement, a flying object-typical noise can also be generated by way thereof in order in that way to check the microphone arrangement and the downstream signal processing and signal evaluation in respect of their correct mode of operation.

A further possible option also provides that a given noise (sound signal) is continuously generated by the loudspeaker, for example a sine sound (or swept-frequency signal) of a quite definite volume and frequency by means of the loudspeaker and a suitable signal source (for example sound signal generator) which passes a signal to the loudspeaker.

As long as that sine signal of the loudspeaker is reliably recognized by the microphone arrangement or the subsequent signal processing procedure (that is very easily possible by virtue of the sine signal) the flight lighting arrangement is not switched on. If now however further noises occur in the environment of the microphone arrangement, for example an aircraft approaches and those flying object noises are in that case superposed with the sine signal of the loudspeaker, the flight lighting arrangement is switched on. As soon as the sound signal of the loudspeaker and the further noise originating from the flying object assume a given volume (and frequency position) relative to each other the sine signal is no longer so easily detected by the signal processing procedure of the microphone arrangement or if the noise of the flying object is very loud it is no longer perceived at all so that then a switch-on signal is generated and the flight lighting arrangement is switched on very easily by virtue of the fact that the sound signal can no longer be detected.

The audible signal which is produced with the loudspeaker (or any other sound generating device) is in particular of a spectrum which is in the region of the typical spectrum of the noise of flying objects so that, upon the approach of a flying object, that is to say an aircraft or a helicopter, it can be expected with a relatively high level of probability that the sound signal generated by the loudspeaker can no longer be recorded at all by the microphone device or can be recorded with falsification thereof to a high degree.

It can however also be advantageous for the sound signal generated by the loudspeaker to be of a quite different frequency or frequencies typical of the noises of flying objects.

A further possible option can also provide that it is not for example a monotone sound signal that is generated by means of the loudspeaker, but a "swept-frequency signal", that is to say a signal which changes the frequency constantly in relation to time, for example within the audible frequency spectrum.

In that respect it is also certainly advantageous if the loudspeaker can also produce a signal in the range of ultrasound or infrasound and accordingly the microphone arrangement should also be capable of recording sounds not only from the audible sound range but also from the infrasound and ultrasound ranges.

That can have the advantage that typical frequencies from the infrasound and ultrasound ranges of flying objects can also be detected in order in that way to be able to reliably conclude that a flying object is approaching and in particular reliably to be able to cause the flight lighting arrangement to switch on.

If therefore the acoustic loudspeaker signal is sufficiently drowned out by a further noise in the surroundings of the microphone, this can also lead to the flight lighting arrangement being switched on.

In the situation where it is raining, in particular where the situation involves heavy rain, but also hail, the interference noise of such weather events will with a level of probability verging on certainty falsify or drown out the acoustic signal of the loudspeaker to such an extent that switch-on of the flight lighting arrangement is then caused and effected. That can be an intentional condition to represent the particularly high sensitivity of the acoustic monitoring.

The advantage of producing an acoustic signal by the loudspeaker is also that acoustic monitoring is thus constantly in operation and the mode of operation of the acoustic monitoring can thus also be constantly checked.

Due to the inherent noises typical of the wind power installation, for example upon pitch adjustments, azimuth adjustment or the like, care should also be taken to ensure, when setting the monitoring procedure, that the flight lighting arrangement is not immediately switched on whenever the loudspeaker signal is even briefly once drowned out by another signal. As pitch adjustment or also azimuth adjustment is in any case effected only for a very short period of time, for example pitch adjustment usually lasts no longer than 5 seconds and similarly also for azimuth adjustment, a test algorithm can therefore be disposed in the acoustic monitoring system, which checks how long the loudspeaker signal is no longer recognized, or is recognized in seriously falsified form, by the microphone arrangement or signal processing.

If for example the loudspeaker signal is falsified for a predetermined period of time, for example less than 5 seconds, it can be concluded with a fair degree of certainty that there is a noise event caused by the wind power installation itself and thus the flight lighting arrangement remains switched off or it is not switched on because of that. If however the time length of acoustic influencing of the loudspeaker signal is greater than the predetermined period of time, for example longer than 5 seconds or longer than 10 seconds, longer than 15 seconds and so forth, the flight lighting arrangement is then switched on because it can be assumed that such long acoustic influencing or drowning-out of the loudspeaker signal is to be attributed to a noise event which does not originate from the wind power installation itself.

When a flying object approaches, then, with a normal volume, that is usually already to be acoustically perceived beforehand over a relatively long period of time, for example more than 20 seconds, often even several minutes.

As already described it is also certainly desirable to provide for localization of the approaching flying object, by means of the microphone arrangement.

If the microphone arrangement has for example three microphones, the transit time and the transit time difference for the incoming sound of the flying object means that it is already approximately possible to make a preliminary estimate as to the side from which the flying object is approaching the wind power installation or wind park.

It is desirable however that it is not all the entire air space, in particular not that at the ground side of the wind power installation, that is monitored, but essentially only a space which is defined around the pod and which is defined at approximately ±15 to 45°, preferably ±15°, relative to the notional horizon of the pod.

The reason for this is that it is precisely from that region that the flying objects which could approach the wind power installation in dangerous fashion at all are to be expected.

It will be appreciated however that it is also possible for the entire air space around the wind power installation itself to be acoustically monitored by means of microphones with an omnidirectional characteristic.

If however only a quite specific portion, for example the described 360° circular ring (strip) around the pod, is to be monitored it is also possible to use directional microphones which particularly sensitively monitor precisely that region. In that case it is also possible to use not just stationery directional microphones but also a directional microphone which is carried on a motor-driven support and which thus continuously passes over the entire 360° plane and thus in a certain way "scans" the horizon for acoustic events.

Microphones which have a cardioid or supercardioid directional characteristic are also particularly suitable for carrying out some embodiments and if a plurality thereof, for example three or more, are arranged on the pod, the horizon ±15° (in that respect the horizon is related to the height of the hub) can thus be very well monitored for acoustic noises and events.

To improve localization of a flying object however the microphone signals can also be subjected to detailed further processing in order thereby to be able to relatively precisely determine the exact location of the located flying object.

The microphone arrangement can also be used for acoustically monitoring the entire wind power installation. At any event audible acoustic events of the wind power installation in the region of the pod are in any case recorded by the microphone arrangement. If then the microphone arrangement is also connected to a memory device and/or a data communication device with a suitable central station (in which for example there are people) then the noises recorded by the microphone arrangement can be listened to there and appropriately assessed.

It is also conceivable in such a case for the microphone arrangement to be used as an emergency communication line with the central station, for if service technicians or the like should be in the pod of the wind power installation and they are in distress, they could accordingly set up a communication connection by way of the microphone arrangement with the central station, in particular the central service station, and draw attention to their own circumstances.

As described the acoustic monitoring device serves primarily to firstly really detect the approach of a flying object, for example an aircraft or a helicopter.

Under some circumstances it is also possible, by adjustment of the acoustic monitoring device, to already implement a localization operation for the possible position of the flying object, that is to say to determine the location thereof.

If now a flying object approaches the wind power installation or wind park the volume which that flying object causes and which is recorded and evaluated by the acoustic monitoring device by means of the microphone arrangement will in that case steadily increase.

A further variant provides that, upon a rise in the volume of the flying object, the change in the control of the flight lighting arrangement can also be effected.

Usually the flight lighting arrangement of wind power installations comprises flashing lamps which produce a light flash in a given rhythm or lamps which are switched on and off in a given rhythm and for a quite specific time, for example in the rhythm of "switch on for one second, switch off for one second, switch on for one second, switch off for one second, and so forth".

In that respect, in the case of the flight lighting arrangements, lighting means with white light is also usually employed for daylight lighting, whereas light of a red color is usually employed for night time flight lighting.

If now, as already mentioned, a flying object approaches the acoustic monitoring device and in that case the volume changes, namely becomes greater, it is very easily possible for the flight lighting arrangement also to change with the corresponding increase in volume by either changing the flashing/lighting-on/switch-off rhythm, for example with increasing volume the flashing frequency or the lighting-on/switch-off frequency is increased, and/or by changing the brightness of the flight lighting arrangement with increasing volume (the volume can be relatively easily established in the signal processing device), by for example the light intensity of the lighting means being appropriately increased with increasing volume from the flying object.

A further measure can provide that, under some circumstances, even the various lighting means, that is to say red light and white light (red flash/white flash) are alternately switched on, which particularly at night would draw the attention of the aircraft pilot of the flying object to a very great extent, for the white light is usually extremely bright and therefore can scarcely be overlooked.

Consequently for example the above-described control of the lighting means of the flight lighting arrangement can be implemented by a program in the PC, by given light events being associated with given volume values which are measured with the microphone arrangement of the acoustic monitoring device, for example flashing frequency or switching-on/switching-off frequency and/or light intensity of the lighting means.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind park comprising one or more wind power installations, the wind park comprising:

an acoustic monitoring device having a microphone arrangement, wherein the microphone arrangement records sound signals in an environment of the wind park;

a signal processing device coupled to the microphone arrangement, wherein the signal processing device is configured to receive the sound signals from the acoustic monitoring device and compare said sound signals to threshold values;

a flight lighting arrangement located on at least one wind power installation of the wind park; and a switching device coupled to and controlled by the signal processing device so that the signal processing device causes the switching device to switch on the flight lighting arrangement when a sound signal is above the threshold value.

2. The wind park according to claim 1 wherein the microphone arrangement is arranged on a pod of one of the wind power installations.

3. The wind park according to claim 1 wherein associated with the acoustic monitoring device is an active or passive filter device configured to filter at least one of wind noise, ground vehicle noise, and wind power installation noise from the sound signal.

4. The wind park according to claim 2 wherein the microphone arrangement comprises at least two microphones, wherein the at least two microphones are arranged at a given spacing relative to each other on different sides of the pod of the wind power installation.

5. The wind park according to claim 1 wherein the wind park has a first plurality of wind power installations that are at an edge of the wind park and a second plurality of wind power installations that are inward of the edge of the wind park, wherein only the first plurality of wind power installations that are at the edge of the wind park include acoustic monitoring devices.

6. The wind park according to claim 1 wherein at least one wind power installation of the wind park is equipped with a secondary radar device, the secondary radar device being configured to receive transponder signals that include at least one of height information and location information, and when the transponder signal is below or above a threshold value, the flight lighting arrangement of the wind power installation of the wind park is switched on.

7. The wind park according to claim 6 wherein when the secondary radar device receives a transponder signal that includes height information that is greater than a predetermined value, the flight lighting arrangement on the at least one wind power installation remains switched off if at the same time no corresponding noise signal is detected by way of the acoustic monitoring device and the flight lighting arrangement is switched on if a noise signal is detected by the microphone arrangement.

8. The wind park according to claim 1 wherein the acoustic monitoring device is configured to detect an approximate position of a device emitting the sound signals.

9. The wind park according to claim 6 further comprising a central processing unit coupled to the signal processing device, wherein when a noise signal is detected by the acoustic monitoring device and a transponder signal is not received at approximately the same time, the central processing unit is configured to send a corresponding item of information to an airspace monitoring station.

10. The wind park according to claim 1 wherein one of the wind power installations is equipped with a loudspeaker for testing the microphone arrangement and the acoustic monitoring device, and associated with the loudspeaker is a corresponding signal source in which a typical noise of a flying object is stored.

11. The wind park according to claim 1 further comprising an acoustic data bank in which acoustic signals or a frequency spectrum of various flying objects are stored to provide the threshold values, and wherein the signal processing device is configured to compare the acoustic signals or the frequency spectrum to the sound signal recorded by the microphone arrangement.

12. The wind park according to claim 1 further comprising a central computer coupled to each of the wind power installations, wherein all flight lighting arrangements of the wind power installations of the wind park are controlled by way of the central computer,
wherein said central computer is in one of the wind power installations of the wind park, said central computer is coupled to the microphone arrangement, and in the event of the flight lighting arrangement of the wind park being switched on, all of the flight lighting arrangements are switched on.

13. The wind park according to claim 12 wherein the central computer of the wind park is coupled to a radar device and in response to receiving a transponder signal that is intended to trigger switching the flight lighting arrangement on, the flight lighting arrangements are switched on.

14. The wind park according to claim 1 wherein a wind power installation of the wind park is equipped with a loudspeaker configured to simulate flight noises of a flying object.

15. The wind park according to claim 1 wherein a microphone or microphones of the microphone arrangement are provided with a solid-borne sound insulation to suppress sound signals produced by the wind power installation itself.

16. The wind park according to claim 1 wherein a wind power installation of the wind park is equipped with a sound signal source for producing a predetermined sound signal, wherein the flight lighting arrangement is not switched on or remains switched off as long as the microphone arrangement records the predetermined sound signal of the loudspeaker with adequate quality, and wherein the flight lighting arrangement of the wind power installation or installations of the wind park is switched on when the sound signal is drowned out by another noise.

17. The wind park according to claim 1 wherein the microphone or microphones of the microphone arrangement are arranged within the pod of a wind power installation.

18. A method of controlling a flight lighting arrangement of a wind park that includes one or more wind power installations, the method comprising:
recording sound signals in an environment of the wind park;
comparing the sound signals to threshold values; and
in response to the sound signals being above the threshold values, switching on a flight lighting arrangement of at least one wind power installation of the wind park.

19. The method according to claim 18 filtering the sound signals before comparing the sound signals to the threshold values.

20. The method according to claim 18 wherein in response to the sound signals being above the threshold values, switching on the flight lighting arrangement comprises switching on the flight lighting arrangement of a plurality of wind power installation of the wind park.

* * * * *